US008886561B2

(12) United States Patent
Gilbert et al.

(10) Patent No.: US 8,886,561 B2
(45) Date of Patent: *Nov. 11, 2014

(54) ELECTRONIC TRADING AMONG PRINCIPALS AND BROKERS

(71) Applicant: BGC Partners, Inc., New York, NY (US)

(72) Inventors: Andrew C. Gilbert, New York, NY (US); Andrew Stergiopoulos, New York, NY (US); William P. Tselepis, New Providence, NJ (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,337

(22) Filed: Jul. 22, 2013

(65) Prior Publication Data

US 2014/0101019 A1 Apr. 10, 2014

Related U.S. Application Data

(63) Continuation of application No. 10/047,607, filed on Jan. 14, 2002, now Pat. No. 8,494,949.

(60) Provisional application No. 60/295,300, filed on Jun. 1, 2001.

(51) Int. Cl.
*G06Q 40/00* (2012.01)
*G06Q 40/04* (2012.01)

(52) U.S. Cl.
CPC .................................... *G06Q 40/04* (2013.01)
USPC .............................. 705/37; 705/36 R; 705/35

(58) Field of Classification Search
USPC ...................................................... 705/30–39
See application file for complete search history.

(56) References Cited

U.S. PATENT DOCUMENTS 5,101,353 A * 3/1992 Lupien et al. .................... 705/37
5,136,501 A * 8/1992 Silverman et al. ............... 705/37

(Continued)

FOREIGN PATENT DOCUMENTS

EP 0 399 850 A2 11/1990
EP 0 407 026 A2 1/1991

(Continued)

OTHER PUBLICATIONS

Letter of Albert P. Moras and Exhibits Ia—IVb for "QV Trader" and "Bondpage.com", Apr. 4, 2002, 16 pp.

(Continued)

*Primary Examiner* — Gregory Johnson

(57) ABSTRACT

Electronic trading systems and methods which facilitate principal/broker trading are provided. In a first aspect of the invention, a database relating to trading participants in the trading system is designed to indicate which traders utilize a principal/broker relationship and what, if any, limitations are placed on the activity of the broker, trading commands submitted by the broker, and counterparties in a transaction with the broker. In another aspect of the invention, trading commands and executed trades involving principals/brokers may be presented to other traders using special designations. The ability to enter certain trading commands by, and in response to, brokers may be limited. In a further aspect of the invention, anonymous trading features may prevent traders from knowing whether another trader is a broker or principal, may restrict traders from being able to block trading with brokers, and may permit brokers to configure anonymous trading parameters.

32 Claims, 9 Drawing Sheets

(56) References Cited

U.S. PATENT DOCUMENTS

| | | | |
|---|---|---|---|
| 5,297,031 A * | 3/1994 | Gutterman et al. | 705/37 |
| 5,375,055 A * | 12/1994 | Togher et al. | 705/37 |
| 5,546,523 A | 8/1996 | Gatto | |
| 5,585,838 A | 12/1996 | Lawler et al. | |
| 5,806,050 A | 9/1998 | Shinn et al. | |
| 5,809,483 A * | 9/1998 | Broka et al. | 705/37 |
| 5,819,238 A | 10/1998 | Fernholz | |
| 5,884,286 A * | 3/1999 | Daughtery, III | 705/36 R |
| 5,915,209 A | 6/1999 | Lawrence | |
| 5,924,082 A * | 7/1999 | Silverman et al. | 705/37 |
| 5,924,083 A | 7/1999 | Silverman et al. | |
| 5,970,479 A | 10/1999 | Shepherd | |
| 6,014,627 A * | 1/2000 | Togher et al. | 705/38 |
| 6,029,146 A | 2/2000 | Hawkins et al. | |
| 6,058,379 A * | 5/2000 | Odom et al. | 705/37 |
| 6,061,789 A | 5/2000 | Hauser | |
| 6,098,051 A | 8/2000 | Lupien et al. | |
| 6,272,474 B1 * | 8/2001 | Garcia | 705/36 R |
| 6,304,858 B1 * | 10/2001 | Mosler et al. | 705/37 |
| 6,317,727 B1 * | 11/2001 | May | 705/36 R |
| 6,418,419 B1 * | 7/2002 | Nieboer et al. | 705/37 |
| 6,421,653 B1 | 7/2002 | May | |
| 6,519,574 B1 * | 2/2003 | Wilton et al. | 705/35 |
| H2064 H * | 5/2003 | Buchalter | 705/37 |
| 6,578,014 B1 | 6/2003 | Murcko, Jr. | |
| 6,618,707 B1 * | 9/2003 | Gary | 705/36 R |
| 6,625,583 B1 | 9/2003 | Silverman et al. | |
| 6,985,883 B1 * | 1/2006 | Togher et al. | 705/37 |
| 6,993,504 B1 * | 1/2006 | Friesen et al. | 705/37 |
| 7,013,292 B1 | 3/2006 | Hsu et al. | |
| 7,035,819 B1 * | 4/2006 | Gianakouros et al. | 705/37 |
| 7,089,205 B1 * | 8/2006 | Abernethy | 705/37 |
| 7,110,972 B1 * | 9/2006 | Handa et al. | 705/37 |
| 7,130,823 B1 * | 10/2006 | Rayner et al. | 705/37 |
| 7,130,824 B1 * | 10/2006 | Amanat et al. | 705/37 |
| 7,136,834 B1 * | 11/2006 | Merrin et al. | 705/37 |
| 7,165,045 B1 * | 1/2007 | Kim-E | 705/37 |
| 7,177,833 B1 * | 2/2007 | Marynowski et al. | 705/38 |
| 7,212,993 B1 * | 5/2007 | Bodurtha et al. | 705/35 |
| 7,212,999 B2 * | 5/2007 | Friesen et al. | 705/37 |
| 7,231,363 B1 * | 6/2007 | Hughes et al. | 705/37 |
| 7,246,093 B1 * | 7/2007 | Katz | 705/37 |
| 7,318,045 B2 * | 1/2008 | Baecker et al. | 705/37 |
| 7,376,614 B1 * | 5/2008 | Scheinberg et al. | 705/37 |
| 7,379,909 B1 * | 5/2008 | Cruz et al. | 705/35 |
| 7,415,432 B1 * | 8/2008 | Gianakouros et al. | 705/36 R |
| 7,447,654 B2 * | 11/2008 | Ben-Levy et al. | 705/37 |
| 7,454,378 B1 * | 11/2008 | White, Jr. | 705/37 |
| 7,475,046 B1 | 1/2009 | Foley et al. | |
| 7,509,284 B2 | 3/2009 | Ginsberg et al. | |
| 7,519,555 B2 | 4/2009 | Ginsberg et al. | |
| 7,529,704 B1 * | 5/2009 | Breslow et al. | 705/37 |
| 7,536,335 B1 * | 5/2009 | Weston et al. | 705/37 |
| 7,606,747 B2 * | 10/2009 | Greenbaum et al. | 705/35 |
| 7,685,048 B1 * | 3/2010 | Hausman et al. | 705/37 |
| 7,765,133 B1 * | 7/2010 | Edelstein et al. | 705/35 |
| 7,873,560 B2 * | 1/2011 | Reich et al. | 705/37 |
| 7,885,882 B1 * | 2/2011 | Brander et al. | 705/36 R |
| 7,933,823 B1 * | 4/2011 | Seifert et al. | 705/36 R |
| 8,180,698 B2 | 5/2012 | Lerner | 705/37 |
| 8,494,949 B2 * | 7/2013 | Gilbert et al. | 705/37 |
| 2001/0014875 A1 * | 8/2001 | Young et al. | 705/37 |
| 2001/0034688 A1 * | 10/2001 | Annunziata | 705/37 |
| 2002/0007335 A1 * | 1/2002 | Millard et al. | 705/37 |
| 2002/0019799 A1 * | 2/2002 | Ginsberg et al. | 705/37 |
| 2002/0023037 A1 * | 2/2002 | White, Jr. | 705/37 |
| 2002/0032632 A1 * | 3/2002 | Sernet | 705/37 |
| 2002/0052827 A1 * | 5/2002 | Waelbroeck et al. | 705/37 |
| 2002/0055901 A1 * | 5/2002 | Gianakouros et al. | 705/37 |
| 2002/0069155 A1 * | 6/2002 | Nafeh et al. | 705/37 |
| 2002/0069156 A1 * | 6/2002 | Adam et al. | 705/37 |
| 2002/0077962 A1 * | 6/2002 | Donato et al. | 705/37 |
| 2002/0099646 A1 * | 7/2002 | Agarwal et al. | 705/37 |
| 2002/0111896 A1 * | 8/2002 | Ben-Levy et al. | 705/37 |
| 2002/0116317 A1 * | 8/2002 | May | 705/37 |
| 2002/0120547 A1 * | 8/2002 | Zajac | 705/37 |
| 2002/0120555 A1 * | 8/2002 | Lerner | 705/37 |
| 2002/0128945 A1 * | 9/2002 | Moss et al. | 705/37 |
| 2002/0128949 A1 * | 9/2002 | Wiesehuegel et al. | 705/37 |
| 2002/0138401 A1 * | 9/2002 | Allen et al. | 705/37 |
| 2002/0152152 A1 * | 10/2002 | Abdelnur et al. | 705/37 |
| 2002/0156716 A1 * | 10/2002 | Adatia | 705/37 |
| 2002/0156719 A1 * | 10/2002 | Finebaum et al. | 705/37 |
| 2002/0169706 A1 * | 11/2002 | Chandra et al. | 705/37 |
| 2002/0169707 A1 * | 11/2002 | Koek et al. | 705/37 |
| 2002/0178102 A1 * | 11/2002 | Scheinberg et al. | 705/37 |
| 2003/0018561 A1 * | 1/2003 | Kitchen et al. | 705/37 |
| 2003/0046218 A1 * | 3/2003 | Albanese et al. | 705/37 |
| 2003/0088499 A1 * | 5/2003 | Gilbert et al. | 705/37 |
| 2003/0093360 A1 * | 5/2003 | May | 705/37 |
| 2003/0097325 A1 * | 5/2003 | Friesen et al. | 705/37 |
| 2005/0044027 A1 * | 2/2005 | Rodgers et al. | 705/35 |
| 2009/0157525 A1 | 6/2009 | Ginsberg et al. | |
| 2011/0004543 A1 | 1/2011 | Ginsberg et al. | |
| 2013/0151390 A1 | 6/2013 | Ginsberg et al. | |

FOREIGN PATENT DOCUMENTS

| | | |
|---|---|---|
| EP | 0 411 748 A2 | 2/1991 |
| EP | 0 512 702 A2 | 11/1992 |
| EP | 1 100 030 | 5/2001 |
| EP | 0 873 549 B1 | 8/2001 |
| WO | WO 97/31322 | 8/1997 |
| WO | WO 01/25996 | 4/2001 |
| WO | WO 01/27836 | 4/2001 |

OTHER PUBLICATIONS

Office Action mailed Jul. 19, 2006, U.S. Appl. No. 09/853,430, entitled "Systems and Method for Anonymous Electronic Trading", 12 pp.
USPTO Office Action for U.S. Appl. No. 11/562,719, Feb. 12, 2008 (11 pages).
USPTO Office Action for U.S. Appl. No. 11/562,674, Feb. 14, 2008 (14 pages).
USPTO Office Action for U.S. Appl. No. 09/853,430, Jul. 19, 2006 (8 pp).
USPTO Office Action for U.S. Appl. No. 09/853,430, Dec. 18, 2006 (9 pp).
USPTO Office Action for U.S. Appl. No. 09/853,430, Jun. 21, 2007 (8 pp).
USPTO Office Action for U.S. Appl. No. 09/853,430, Dec. 31, 2007 (11 pp).
MoneyMatch, Functional Specification, Version 1, Aug. 1990, The Sequor Group Inc. Software Services.
Assorted Documents from QV Trading Systems (not dated).
Assorted Documents from Bondpage (copyright 2001).
PCT Search Report for International Application No. PCT/US01/41525; 5 pages; Oct. 26, 2001.
Seqqour Group Inc., Money Match Functional Specification (Aug. 1990).
PCT Search Report for International Application No. PCT/US02/016820; 3 pages; Apr. 25, 2003.
Notice of Allowance for U.S. Appl. No. 09/853,430; 7 pages; Jan. 12, 2009.
Notice of Allowance for U.S. Appl. No. 11/562,674; 6 pages; Feb. 6, 2009.
Notice of Allowance for U.S. Appl. No. 11/562,719; 7 pages; Jan. 27, 2009.
U.S. PTO Office Action for U.S. Appl. No. 10/047,607; 10 pages; Dec. 19, 2008.
U.S. PTO Office Action for U.S. Appl. No. 12/371,064; Sep. 29, 2011; 14 pages.
CA Office Action for Application No. 2417603; Oct. 27, 2011; 2 pages.
U.S. PTO Office Action for U.S. Appl. No. 12/371,064; Apr. 11, 2012; 10 pages.
CA Examiner's Requisition for Application No. 2417603; Jan. 3, 2013; 2 pages.

(56) References Cited

OTHER PUBLICATIONS

U.S. PTO Office Action for U.S. Appl. No. 10/047,607; Aug. 15, 2012; 34 pages.
US Office Action for U.S. Appl. No. 12/883,683; Aug. 9, 2013; 7 pages.
US Final Office Action for U.S. Appl. No. 12/883,683; Mar. 17, 2014; 9 pages.
US Office Action for U.S. Appl. No. 13/616,839; Dec. 24, 2013; 7 pages.
US Final Office Action for U.S. Appl. No. 13/616,839; Jul. 10, 2014; 8 pages.
CA Examiner's Requisition for Application No. 2417603; May 15, 2014; 4 pages.
CA Examiner's Requisition for Application No. 2783169; Aug. 19, 2013; 4 pages.
U.S. PTO Office Action for U.S. Appl. No. 10/047,607; Nov. 30, 2011; 12 pages.
U.S. PTO Office Action for U.S. Appl. No. 10/047,607; Feb. 16, 2011; 8 pages.
U.S. PTO Office Action for U.S. Appl. No. 10/047,607; Jun. 4, 2010; 8 pages.
U.S. PTO Office Action for U.S. Appl. No. 10/047,607; Feb. 28, 2008; 10 pages.
U.S. PTO Office Action for U.S. Appl. No. 10/047,607; Jul. 9, 2007; 11 pages.
U.S. PTO Office Action for U.S. Appl. No. 10/047,607; Dec. 29, 2006; 10 pages.
US Notice of Allowance for U.S. Appl. No. 10/047,617; Jun. 4, 2013; 16 pages.

* cited by examiner

| Type | Size | User Name | Inst Name | Price/Rate | Sell Price | Time | Sell Date | Trade Slide | Trade Ref # | End Date | Counterparty Name | Comments |
|---|---|---|---|---|---|---|---|---|---|---|---|---|
| BOUGHT | 50 | spark38 | CINP_2D | 43.50 | 43.50 | 09:50:27 | 04/11 | 04/13 | Passive | B98699703000293 | 04/13 | TEST5 | 16 HRS (PEAK he07:00 - he22: |
| BOUGHT | 50 | spark38 | CINP_JUN_01 | 77.00 | 77.00 | 09:50:33 | 04/11 | 06/01 | Passive | B98699703500293 | | TEST5 | 21 DAYS x 16 HRS (PEAK he07 |

ELECTRONIC TRADING AMONG PRINCIPALS AND BROKERS

CROSS REFERENCE TO RELATED APPLICATIONS

This application is a continuation of U.S. patent application Ser. No. 10/047,607, filed Jan. 14, 2002, issued Jul. 23, 2013 as U.S. Pat. No. 8,494,949; which is a nonprovisional application of U.S. Provisional App. No. 60/295,300, filed Jun. 1, 2001, each of which is incorporated by reference.

BACKGROUND OF THE INVENTION

This invention relates to processes for electronic trading systems. More particularly, this invention relates to systems and methods for electronic trading that permit principal/broker trading.

With the expansion of the use and capabilities of computer infrastructure there has been a corresponding progression of buyer/seller transactions away from classical "open outcry auctions" toward electronic trading systems. Computer-based electronic trading systems have been used in a variety of markets including, for example, stocks, bonds, currency, commodities and futures markets. The use of electronic trading systems offers many advantages over conventional methods for trading including increased speed of price dissemination and trade execution, reduced transaction costs, potential for trading across multiple markets simultaneously, reduced probability of erroneous trades, enhanced compliance with credit limits, reduction of risk exposure, and the potential to provide controlled anonymous trading.

In an electronic trading system, a trader desiring to make a trade may directly access a trading system, typically using a trading system workstation, personal computer, dumb terminal connected to a network, or any other suitable device, and submit trading commands to participate in an electronic transaction. For example, a first trader may submit a bid to buy a certain quantity (or size) of a given item at a specified price using a workstation that is part of the electronic trading system. In response to this bid, a second trader may sell a certain quantity and "hit" the bid by pressing a suitable button or entering a command on another workstation connected to the trading system. If the second trader meets certain requirements, the second trader then causes a trade to be executed upon hitting the first trader's bid.

Despite the advantages afforded by electronic trading systems, some traders cannot or do not wish to operate electronic trading system workstations. They may lack the computer equipment or competency required to operate a workstation, or may simply not wish to perform the related duties. Instead these traders may act as a principal trader and call a broker trader of an electronic trading system and verbally relay their requested transaction. Alternatively, a principal trader may use instant messaging or electronic mail (e-mail) communications to convey information to a broker trader regarding a requested transaction. All of these types of communications require that a broker trader receiving the communications submit corresponding trading commands into an electronic trading system. Thus, there may exist principal traders, who direct the trading actions of broker traders, and broker traders who actually utilize the electronic trading system to engage in trading.

Thus, it is an object of the invention to provide systems and methods for electronic trading that permit principal/broker trading.

SUMMARY OF THE INVENTION

This and other objects of the invention are accomplished in accordance with the principles of the present invention by providing systems and methods for electronic trading that permit principal/broker trading.

In accordance with the invention, these systems and methods provide a variety of features in an electronic trading system to facilitate principal/broker trading using the electronic trading system. The systems and methods provide a plurality of workstations which present trading information to traders on a display screen and enable those traders to respond to that trading information to complete a trade. Trading is controlled using a processor that is coupled to the plurality of workstations. In a first aspect of the invention, a database containing information relating to traders in the trading system is designed to indicate which participants utilize a principal/broker relationship and what, if any, limitations are placed on the activity of the broker trader, such as on types of trading commands submitted by the broker trader, and counterparties in a transaction with the broker trader. In another aspect of the invention, trading commands and executed trades involving principals/brokers may be presented to other traders using a specific designation on the display screen. Similarly, the ability of broker traders to enter certain trading commands, and the ability of other traders to enter certain trading commands in response to broker traders, may be limited. In a further aspect of the invention, anonymous trading features may prevent traders from knowing whether another trader is a broker or principal, may prevent traders from being able to block trading with broker traders, and may permit broker traders to configure anonymous trading parameters for their principals.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which:

FIG. 4 is an illustration of a trade history interface that may be presented in accordance with certain embodiments of the present invention;

DETAILED DESCRIPTION OF THE INVENTION

The present invention is now described in connection with FIGS. 1-7. Although the present invention is described below in connection with a bid/offer, hit/take trading system, it should be apparent to one of ordinary skill in the art that many of the features of the present invention may be used with any other suitable trading, information display, and/or data processing system that enables the buying and selling of all items in an electronic environment for trading.

Figure 1:
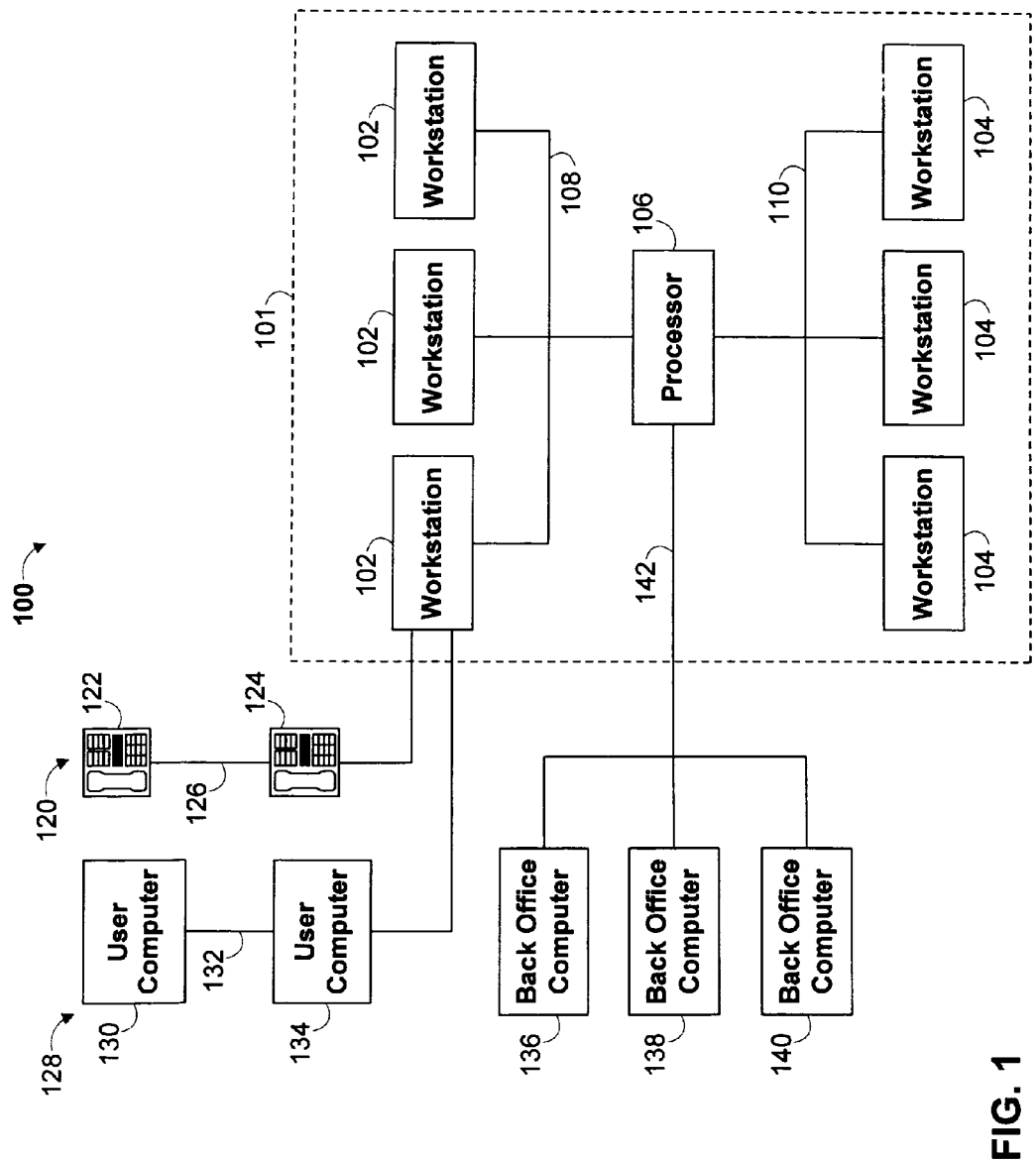
FIG. 1 is a block diagram of one embodiment of hardware that may be used to implement the present invention.

Turning first to FIG. 1, an example of hardware 100 that may be used to implement one embodiment of the present invention is shown. As illustrated, hardware 100 may include an electronic trading system 101 comprising one or more local workstations 102 and one or more remote workstations 104 that may be used by traders to view trading data and enter trading commands. Workstations 102 and 104 may be any suitable means for presenting data and, in preferred embodiments of this invention, accepting input. For example, workstations 102 and 104 may be personal computers, laptop computers, mainframe computer terminals, dumb terminals, data displays, Internet browsers, Personal Digital Assistants (PDAs), two-way pagers, wireless terminals, portable telephones, etc., or any combination of the same.

To orchestrate trading between traders using workstations 102 and 104, the workstations preferably submit commands to, and receive data to be displayed from, a processor 106 that is also part of system 101. In alternative embodiments, however, workstations may communicate with additional processors, or include processors to orchestrate trading in a distributed fashion without requiring processor 106. In yet other embodiments, processor 106 may be connected to an external trading system (not shown) that controls trading by the traders. Processor 106, and any additional processors, may be any suitable circuitry or devices capable of processing data such as microprocessors, personal computers, network servers, mainframe computers, dedicated computer systems, etc.

Processor 106 may include or be coupled to a database for storing information relating to traders (whether acting as principal or broker), items traded, trades executed, and/or any other suitable information. This database may be implemented using any suitable hardware and/or software.

As shown, processor 106 may be connected to workstations 102 and 104 by networks 108 and 110 of system 101, respectively. Each of networks 108 and 110 may be any suitable data network for communicating data between workstations 102 and 104 and processor 106, such as a local area network, a wide area network, the Internet, an intranet, a wireless network, a hard wired connection, a dial-up network, etc., or any combination of the same. In an arrangement of hardware 100 without processor 106, workstations 102 and 104 may be linked together by networks 108 and 110 directly.

As also shown in FIG. 1, a telephone network 120 may be provided that comprises a principal telephone 122 and a broker telephone 124 connected by a telephone line 126. Telephone network 120 may be used to enable a principal at a remote location to communicate with a broker at a workstation 102. The broker would receive trading instructions from the principal and then input required information into workstation 102. This may be useful when the principal does not have access to a workstation 102 or 104 or when the principal only has access to a display-only workstation 102 or 104. Obviously, telephone network 120 may be implemented as a private telephone network, a public telephone network, a wireless telephone network, or any suitable combination of the same.

Similarly, as further shown in FIG. 1, computer communication network 128 may be provided. Computer communication network 128 may include user computers 130 and 134 and data network 132. User computers 130 and 134 may be used to provide instant messaging, e-mail, "voice over IP," video conferencing, and any other suitable communication functions. Computers 130 and 132 may be personal computers, laptop computers, mainframe computer terminals, dumb terminals, data displays, Internet browsers, Personal Digital Assistants (PDAs), two-way pagers, wireless terminals, portable telephones, etc., or any combination of the same. Data network 132 may be any suitable data network for communicating data between computers 130 and 134, such as a local area network, a wide area network, the Internet, an intranet, a wireless network, a hard wired connection, a dial-up network, etc., or any combination of the same, and may be the same network as any of networks 108 and 110.

As still further shown in FIG. 1, a connection 142 from processor 106 to back office computers 136, 138, and 140 of trading entities (e.g., banks, investment firms, trading firms, etc.) may also be provided. Connection 142 may facilitate trading history information, credit information, and any other suitable data being transferred between processor 106 and computers 136, 138, and 140. For example, trade data may be sent from processor 106 to back office computer 136 to initiate subsequent clearing of a trade from a trader employed by the owner of computer 136 and operating one of workstations 104. Computers 136, 138, and 140 may be any suitable circuitry or devices capable of processing data such as microprocessors, personal computers, network servers, mainframe computers, dedicated computer systems, etc. Connection 142 may be any suitable data network for communicating data between processor 106 and computers 136, 138, and 140, such as a local area network, a wide area network, the Internet, an intranet, a wireless network, a hard wired connection, a dial-up network, etc., or any combination of the same, and may be the same network as any of networks 108, 110, and 132.

When used to implement a bid/offer, hit/take trading system as described above or connect to an external bid/offer, hit/take trading system, hardware 100 may enable a trader to submit a bid to buy, or an offer to sell, an item at one of workstations 102 and 104. This bid or offer (both passive trading commands) may then be communicated to processor 106, where the bid or offer can be ranked and stored in a bid-offer queue. The ranking may be based upon time of submission, price, or any other suitable criterion. The bid or offer may then be presented to other traders via other workstations 102 and 104 dependent upon its ranking in the bid-offer queue. Once displayed, the bid or offer can then be hit or taken (both aggressive trading commands) by one or more of the other traders so that a trade of the item can proceed to execution.

Figure 2:
FIG. 2 is an illustration of a market cell screen display that may be presented in accordance with certain embodiments of the present invention.

An example of a display 200 for presenting a bid and offer 201 to a trader is shown in FIG. 2. As illustrated, bid and offer 201 may include portions indicating a description of the underlying instrument 202, a bid price 204, an offer price 206, a bid size 208, and an offer size 210. In accordance with the present invention, these portions of bid and offer 201 may be highlighted with one or more colors, or in any other suitable manner, to indicate various traits of the bid and offer. For example, portions 204 and 208 may be colored purple to indicate that a counterparty principle trader is using a broker trader to submit the corresponding bid or offer to the trading system. As another example, portions 204 and 208 may be colored red to indicate that a counterparty switch of the bidder has been turned off by the trader and, thus, is not tradable by the trader as explained below in connection with FIGS. 5-7.

Figure 3:
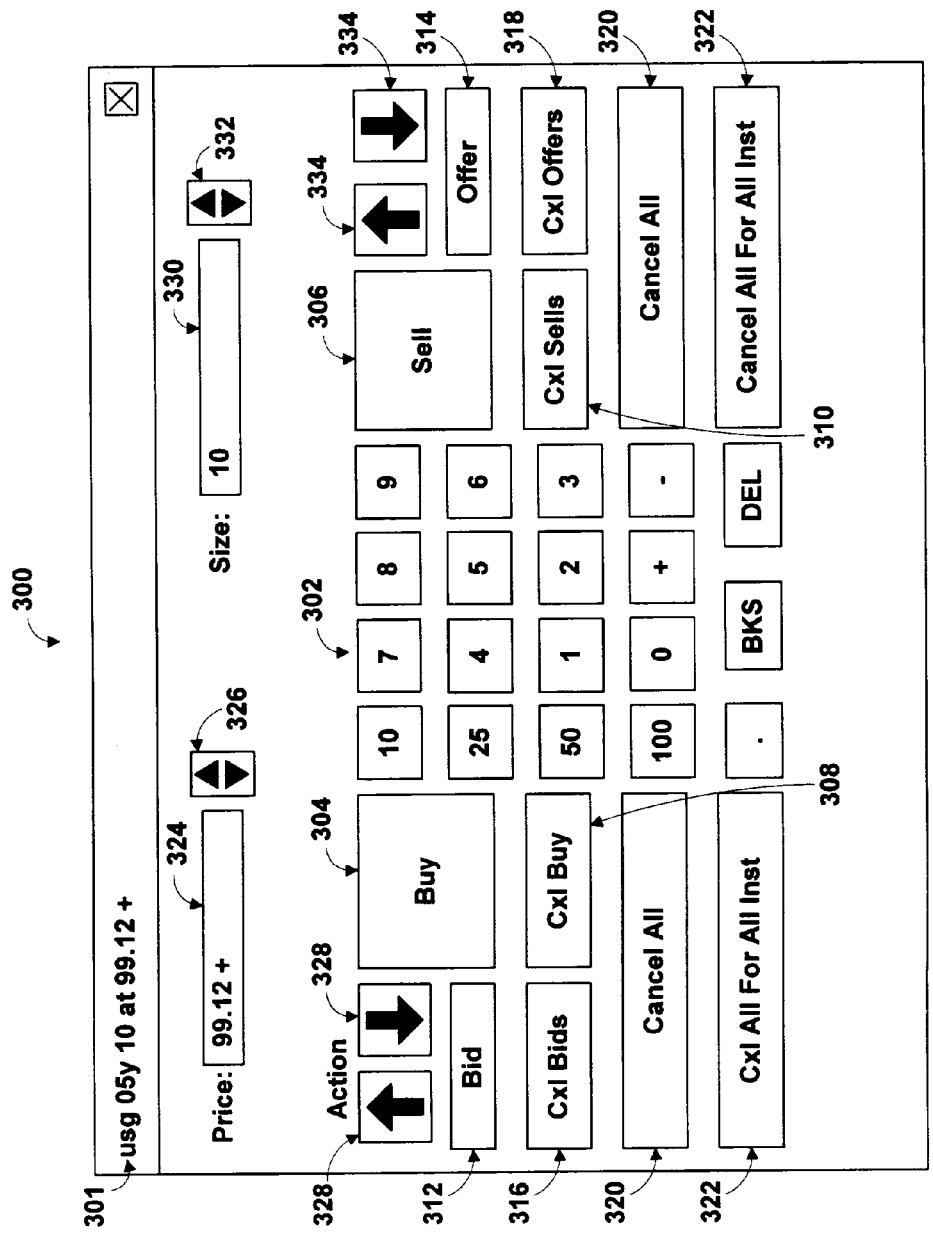
FIG. 3 is an illustration of a trading interface that may be presented in accordance with certain embodiments of the present invention.

Turning to FIG. 3, an interface 300 is shown that may be used to submit and respond to bids and offers presented in display 200 in accordance with the present invention. Interface 300 may be presented on a trader's workstation in response to the trader clicking on any of portions 202, 204, 206, 208, and 210 of bid and offer 201. When presented, interface 300 may then indicate information about the bid and offer clicked-on by the trader in a display 301. As shown, for example, upon the trader clicking on portion 204 of bid and offer 201, interface 300 may be presented with the instrument "usg 05Y" indicated in display 301. Display 301 may also indicate the current bid price for the instrument (i.e., "99.12+") and the current bid size for the instrument (i.e., "10").

As also shown in FIG. 3, a variety of buttons and entry fields may be incorporated into interface 300. At the center of interface 300, a numeric keypad 302 is displayed. As illustrated, numeric keypad 302 provides buttons for numbers zero through nine, ten, twenty-five, fifty, and one hundred. Numeric keypad 302 also contains a plus button ("+"), a minus button ("−"), a decimal point button ("."), a backspace button ("BKS"), and a delete button ("DEL"). Interface 300 also provides a buy button 304, a sell button 306, a cancel buy button 308, a cancel sells button 310, a bid button 312, an offer button 314, a cancel bids button 316, a cancel offers button 318, cancel all buttons 320, cancel all for all instruments buttons 322, a price entry field 324, price up and down buttons 326, bid price up and down buttons 328, offer price up and down buttons 334, a size entry field 330, and size up and down buttons 332.

In order to submit a bid or offer for the instrument indicated in display 301 using interface 300, a trader may first set a bid or offer price and a bid or offer size by entering the appropriate values in fields 324 and 330, respectively, using up and down buttons 326, 328, 332, and/or 334 and/or using keypad 302. Once the desired price and size for the bid or offer have been specified, the trader may then submit the bid or offer by pressing bid button 304 or the offer button 314.

In order to hit a bid or lift (or take) an offer for the instrument indicated in display 301 using interface 300, a trader may first specify a size in field 330 using up and down buttons 332 and/or 334 and/or using keypad 302. Once the desired size has been specified, the trader may then hit the bid or lift (or take) the offer for the specified size by pressing sell button 306 or buy button 304, respectively.

In the event that a trader desires to cancel a bid, an offer, a hit, or a lift (or take), the trader may press any corresponding one of buttons 308, 310, 316, 318, 320, and 322.

Because limitations may be placed by an administrator of trading system 101 or by a broker trader operating one of workstations 102 or 104 (or by the broker trader's employer or principal, as the case may be), interface 300 may prevent a trader from submitting bids and offers and/or from acting on certain bids and offers posted by another trader, when the trader is acting as a broker. If limitations are to be imposed, the trader will have to provide a designation to the trading system 101 when the trader is acting as a broker trader. Such limitations may be based upon the identity of a potential counterparty. Controls to implement such limitations may be included in a set-up screen of interface 300, or may be transmitted from processor 106 to interface 300 depending on who wants to place the limitation. Similar limitations may be applied to the behavior of a trader acting as a principal. For example, a trader acting as a principal may be permitted to hit bids of broker traders only when those broker traders are representing certain principals.

Displays and interfaces similar to those illustrated in FIGS. 2 and 3 are described in more detail in U.S. patent application Ser. No. 09/745,651, filed Dec. 22, 2000, which is hereby incorporated by reference herein in its entirety.

FIG. 4 illustrates a trade history interface 400 that may be presented in connection with the display of FIG. 2 and/or the interface of FIG. 3 in accordance with the present invention. Alternatively, all views may be tiled on the screen or may be seen all at once. As shown, interface 400 may present information on trades executed in one or more markets of trading system 101 (FIG. 1). For each trade, this information may include a type 401 for the trade, a size 402 for the trade, a trader name 404 for the trade, an instrument name 406 for the trade, a price/rate trade price 408 for the trade, a settlement price 410 for the trade, a trade posting time 412 for the trade, a trade date 414 for the trade, a settlement date 416 for the trade, a trade side 418 for the trade, a trade reference number 420 for the trade, an end date 422 associated with a contract being traded, a counterparty name 424 for the trade, and comments 426 for the trade.

Because certain trades may have either a trader name 404 or a counterparty name 424 that is of a trader acting as a broker rather than that of a trader acting as a principal (i.e., the client of the broker), a trader or the operator of trading system 101 may desire not to have information for those trades displayed in interface 400. In such instances the information may be blocked from being displayed at least until the portions of the information corresponding to the broker are replaced with information relating to the principal, when such information is known. Similarly, special messages may be displayed to alert a trader that a counterparty is acting as a broker so that the trader can decide whether to confirm that the broker has the authority to complete the trade. For example, trader name 404 or counterparty name 424 may indicate "Bank A—verify trade with desk." In this example, "Bank A" may be the name of the principal of the broker. As another example, trader name 404 or counterparty name 424 may simply indicate "Call desk to verify trade."

In certain instances, traders using trading system 101 may desire to trade anonymously. This may be the because one or more of the traders is concerned that he or she will not receive the true market price when trading, but rather inflated prices, for example. Systems and methods for anonymous electronic trading are disclosed in detail in U.S. provisional application No. 60/223,028, filed Aug. 4, 2000, and U.S. patent application Ser. No. 09/853,430 filed May 10, 2001 which is hereby incorporated by reference herein in its entirety.

Figure 5:
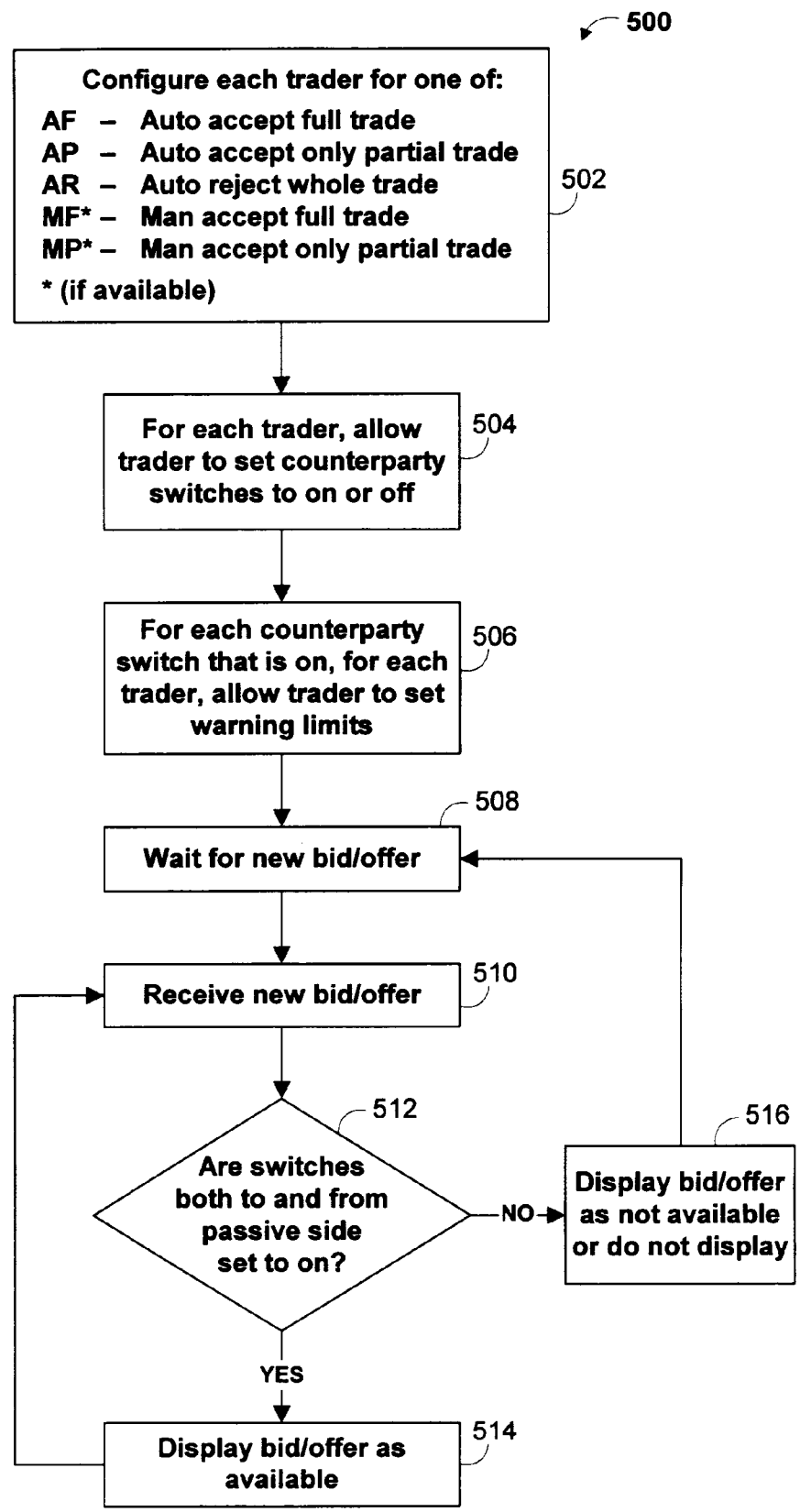
FIG. 5 is a flow diagram of a process for configuring trader workstations and processing bids and offers in accordance with certain embodiments of the present invention.

Turning to FIG. 5, a process 500 for configuring a workstation 102 or 104 (FIG. 1) and processing bids and offers that may be executed in processor 106 (FIG. 1) in accordance with one embodiment of the present invention is shown. As illustrated at step 502, process 500 may first allow a trader to select how the workstation is to react when a bid or offer is hit or lifted, respectively, and when execution of a trade would exceed a warning limit of one of the traders in the trade. The workstation may be configured to automatically accept the full trade, automatically accept only the part of the trade that would not exceed the warning limits of both traders, automatically reject the whole trade, manually accept the full trade after prompting the trader, or manually accept only the part of the trade that would not exceed the warning limits of both traders after prompting the trader. The options of manually accepting the full trade and manually accepting only part of the trade may not be available at workstations 102 or 104 (FIG. 1) in order to speed trading, simplify trading, or limit decision making by traders with respect to counterparty risk. Alternatively, the manual options may be available and the automatic options may not be available in some embodiments of the invention.

Figure 7:
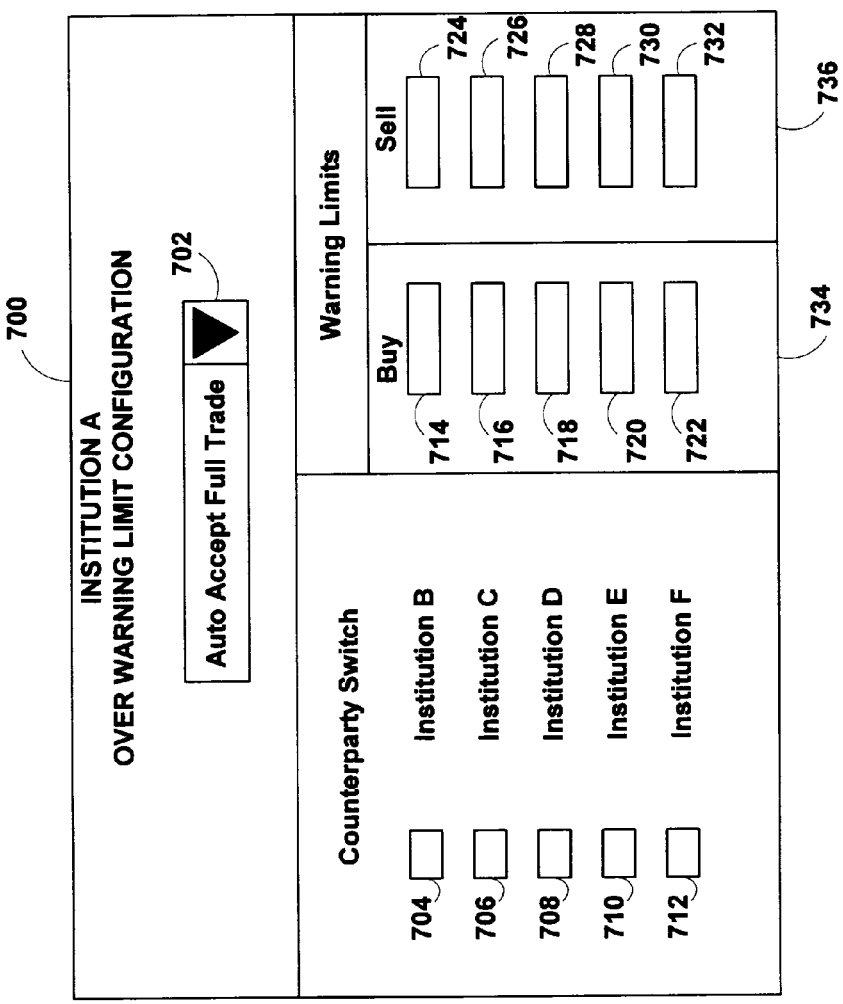
FIG. 7 is an illustration of a configuration interface that may be used to configure trader workstations in accordance with certain embodiments of the present invention.

Referring to FIG. 7, an example of an interface 700 that facilitates selection of one of these options is shown. As illustrated, by selecting one of the options from drop-down menu 702, a trader can select how the workstation is to react when execution of a trade would exceed a warning limit of at least one of the traders. Although this selection is shown in interface 700 as being made by selecting one of the options from drop-down menu 702, selection of one of these options may be made in any suitable manner.

Turning back to FIG. 5, process 500 may enable each trader to set counterparty switches for the other traders at step 504. These counterparty switches enable a trader to indicate whether the trader wants to be able to trade with each other trader. A trader may indicate that the trader does not want to trade with another trader, for example, because the other trader backed out of a trade on a previous occasion, because the other trader trades only in small sizes, or for any other reason.

As can be seen in FIG. 7, a trader trading at a workstation 102 or 104 on behalf of Institution A may select whether to trade with certain counterparty institutions by selecting which of check boxes 704, 706, 708, 710, and 712 to check. Where a check box is checked, the corresponding institution is preferably set to "ON" so that bids and offers from that institution are presented to the trader.

As shown in FIG. 5, once a trader has set the counterparty switches for the other traders, the trader at step 506 may optionally set warning limits for each counterparty having a counterparty switch that is set to "ON." Through interface 700 of FIG. 7, for example, the trader may set warning limits by specifying values in fields 714, 716, 718, 720, 722, 724, 726, 728, 730, and/or 732. These values may be a total dollar amount of buy and sell side transactions, a total dollar amount of buy side only transactions, a total dollar amount of sell side only transactions, a count of the total number of buy and sell side transactions, a count of the total number of buy side only transactions, a count of the total number of sell side only transactions, any other suitable values or combinations of values that are related to order submission of the counterparty and/or any other characteristic of the trader, or any other suitable values or combinations of values that are independent of order submissions of the counterparty and any other characteristic of the trader. Although interface 700 is illustrated with fields 714, 716, 718, 720 and 722 in a buy column 734 and fields 724, 726, 728, 730, and 732 in a sell column 736, the present invention may be implemented with only a single column for total buy and sell transactions or for only one of buy and sell transactions.

Although steps 502, 504 and 506 are illustrated in process 500 of FIG. 5 in a specific order, these steps may be executed in any suitable order or in parallel if desired.

When a trader is acting as a broker for a principal, it may be necessary for the broker to configure the settings illustrated in FIG. 7. Alternatively, the principal trader may be able to configure these settings in advance through the trading system 101 (FIG. 1) administrator or broker trader's employer, for example, and prohibit the broker trader from altering these settings. In certain embodiments of the invention, traders may be prohibited from turning off the counterparty switch of counterparties using brokers. Alternatively, the traders may be prevented from knowing which counterparties are using brokers.

After a trader has specified warning limits at step 506 of FIG. 5, process 500 may next wait for new bids and offers to be entered at step 508. As explained above, bids and offers may be entered at workstations 102 or 104 (FIG. 1) using an interface 300 as illustrated in and described in connection with FIG. 3. Once a new bid or offer has been entered, process 500 may next receive the bid or offer at step 510. At step 512, process 500 may then determine whether the counterparty switches both to and from the passive side (i.e., the counterparty submitting the bid or offer that was received at step 510) are set to "ON." If both the counterparty switches to and from the passive side are set to "ON," process 500 may then display the bid or offer as available (i.e., a bid or offer that the trader may hit or take (or lift)) at step 514. Otherwise, process 500 may display the bid or offer as not available or may not display the bid or offer at all at step 516. A bid or offer may be displayed as being available or not available by displaying the bid or offer in a corresponding color (e.g., available bids or offers in green and unavailable bids or offers in red), by displaying the bid or offer in a corresponding font (e.g., available bids or offers in bold and unavailable bids or offers in italics), by flashing or not flashing the bid or offer (e.g., available bids or offers flashing and unavailable bids or offers/not flashing), by only displaying a bid or offer if it is available, or in any other suitable manner.

Figure 6A:
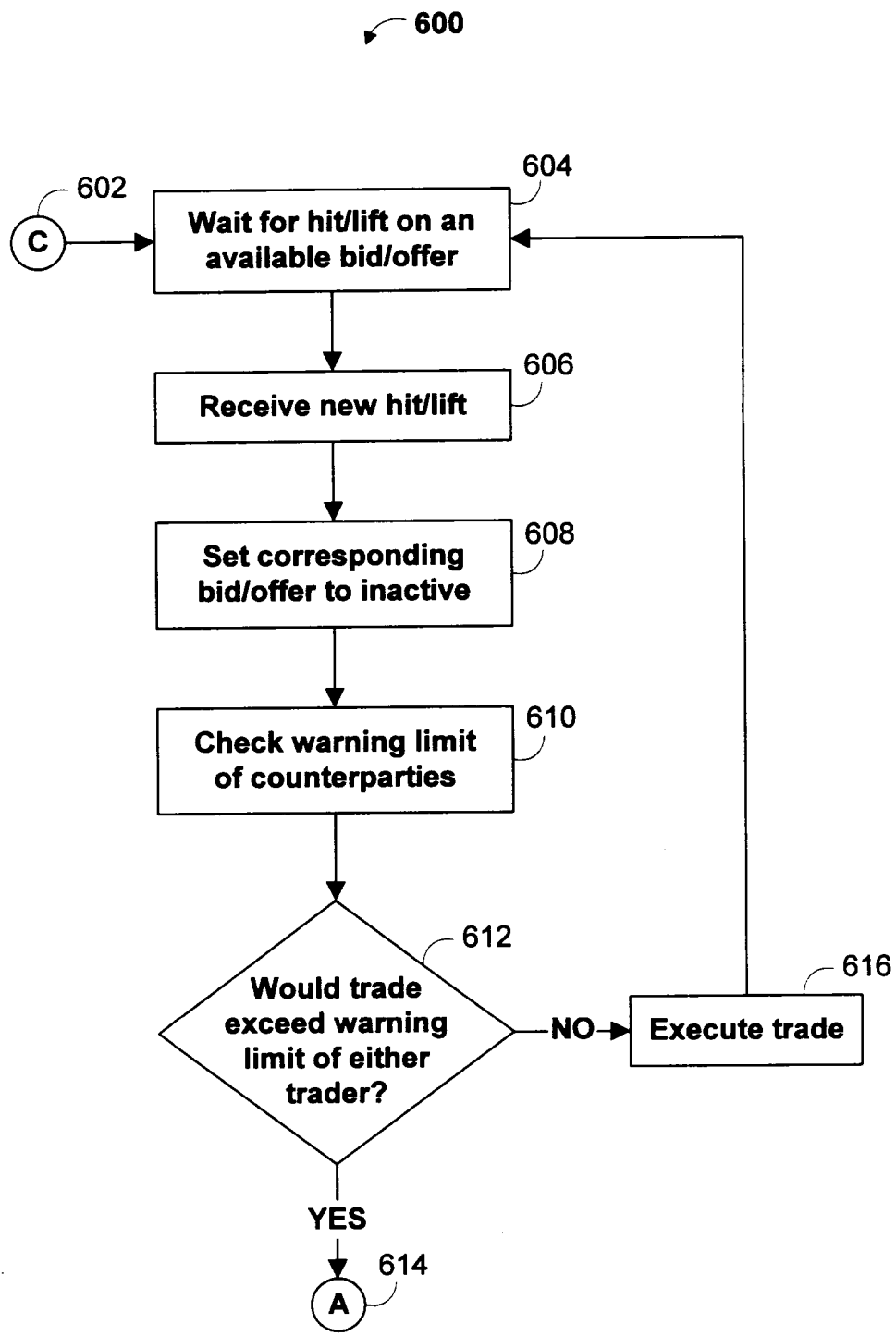
FIGS. 6A-6C are flow diagrams of a process for processing hits and lifts (or takes) and reconfiguring trader workstations in accordance with certain embodiments of the present invention.
Figure 6B:
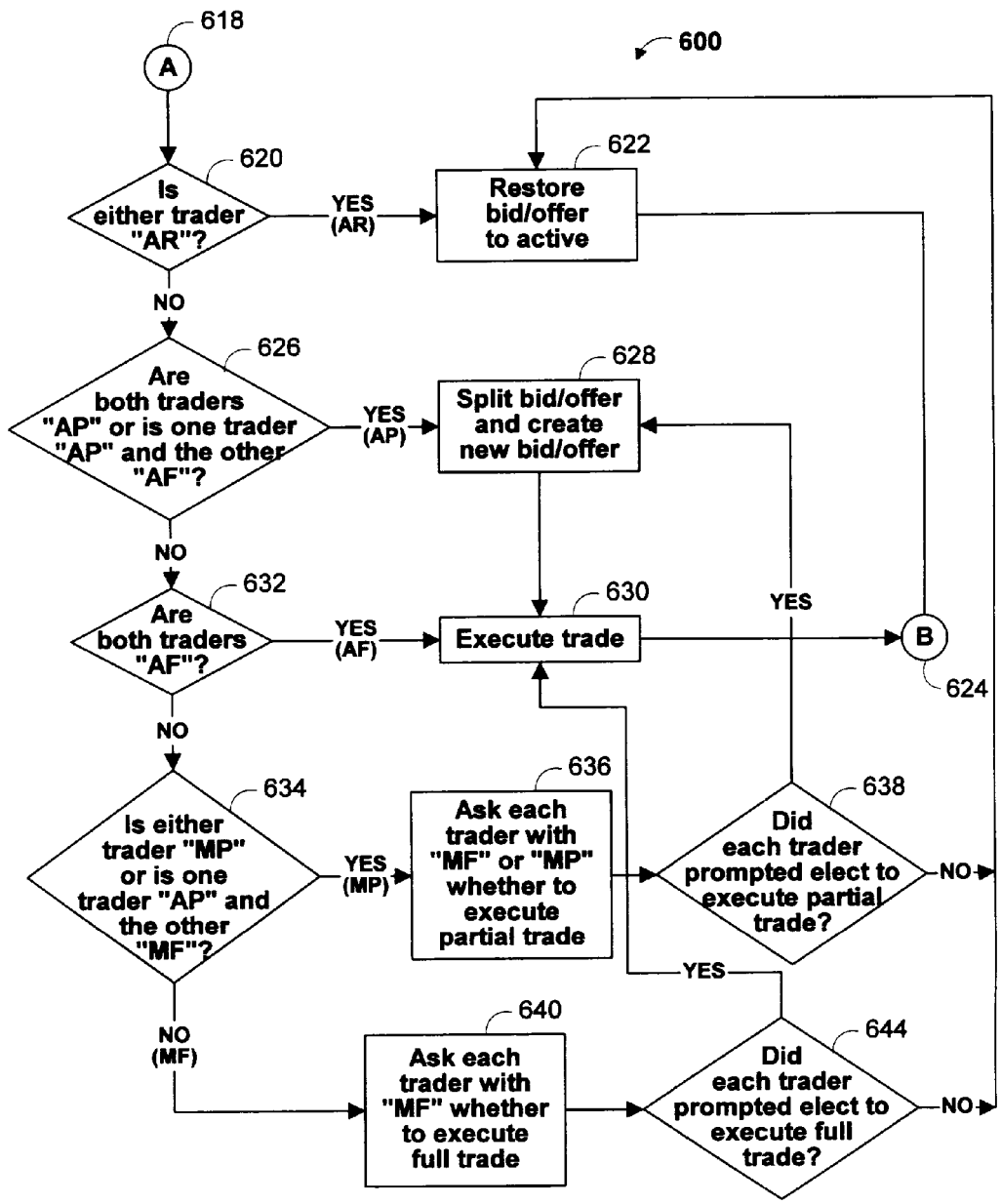
Figure 6C:
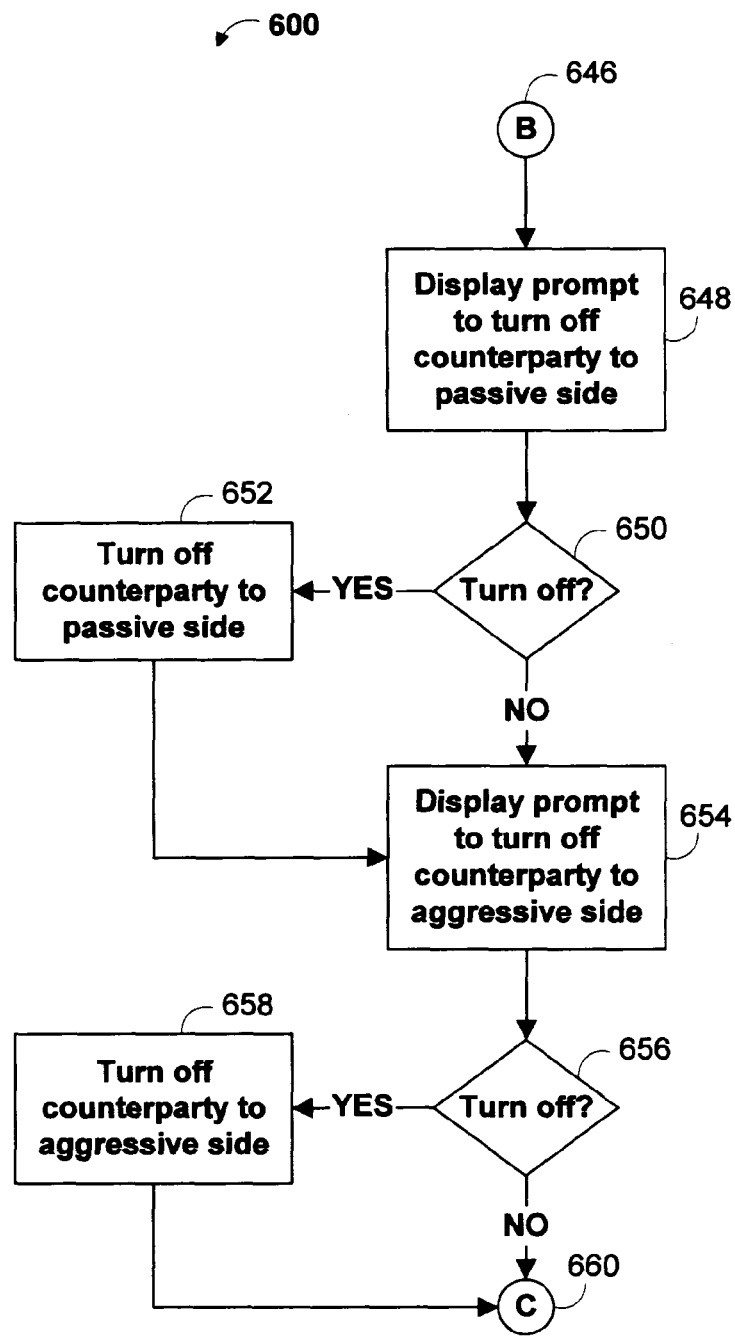

Turning now to FIGS. 6A-6C, a process 600 for processing hits and lifts (or takes) in response to available bids and offers that may be executed in processor 106 (FIG. 1) in accordance with preferred embodiments of the present invention is shown. As explained above, hits and lifts (or takes) may be entered using interface 300 illustrated in and discussed in connection with FIG. 3, for example. Process 600 may begin by waiting for a hit or lift (or take) to be entered on an available bid or offer at step 604. Once a hit or lift is received, process 600 receives the new hit or lift at step 606. The bid or offer for which the hit or lift was received may then be set to inactive at step 608. The bid or offer is set to inactive in order to prevent the bid or offer from being hit or lifted by another trader while process 500 is determining whether execution of the trade corresponding to the hit or lift of the bid or offer can be executed.

Next, at step 610, process 600 may check the warning limits for each of the traders in the trade. In the case where both a buy side warning limit and a sell side warning limit is specified by a trader, step 610 will first select the appropriate limit for each trader. For example, if a trader A hits a bid by a trader B, and traders A and B both set up both a buy side warning limit and a sell side warning limit, for trader A, the sell side warning limit will be checked and for trader B, the buy side warning limit will be checked. In the event where the sell side warning limit has been disabled and a trader has hit or lifted a bid, the trade may be treated as either exceeding the warning limit check or as not exceeding the warning limit check, depending on the settings of the trading system 101 (FIG. 1).

If the trade would not exceed the warning limit of either trader, at step 612, process 600 may branch to step 616 to execute the trade and then return to step 604. Alternatively, if the trade would exceed the warning limit of either trader, process 600 may proceed to step 620 (FIG. 6B) via links 614 and 618 (FIG. 6B).

At step 620, process 600 may then determine if either trader selected automatic rejection of the whole trade in configuring workstations 102 and 104 (FIG. 1). If either trader did select automatic rejection, then process 600 may take the AR branch and restore the bid or offer to active at step 622 so that the bid or offer may be acted upon by other traders. Once a bid or offer has been restored to active at step 622, process 600 may then proceed to step 648 (FIG. 6C) via links 624 and 646 (FIG. 6C).

If neither trader is configured for automatic rejection, then process 600 may determine at step 626 whether both traders selected automatic acceptance of only part of the trade, or whether one trader selected automatic acceptance of only part of the trade and the other trader selected automatic acceptance of the full trade. If not, process 600 may proceed to step 632.

If so, process 600 may take the AP branch and, at step 628, split the bid or offer into a bid or offer for the size that would not exceed either warning limit and a bid or offer for the remaining size. Process 600 may then execute the bid or offer for the size that would not exceed the warning limit at step 630, and proceed to step 648 (FIG. 6C) via links 624 and 646 (FIG. 6C).

At step 632, process 600 may determine whether both traders are configured for automatic acceptance of the full trade. If so, process 600 may then take the AF branch and executes the trade at step 630 and proceed to step 648 (FIG. 6C) via links 624 and 646 (FIG. 6C). Otherwise, process 600 may proceed to step 634.

At step 634, process 600 may determine whether either trader is configured for manual acceptance of only part of the trade or whether one trader is configured for automatic acceptance of only part of the trade and the other trader is configured for manual acceptance of the full trade. If yes, then process 600 may take the MP branch and proceed to step 636 whereupon each trader that is configured for manual acceptance of either only part of the trade or the full trade is asked whether that trader would like to execute a partial trade.

Next, at step 638, process 600 may determine whether each trader prompted at step 636 elected to execute a partial trade. If so, then process 600 may branch to step 628 and perform that step and the subsequent steps in process 600 as described above. Otherwise process 600 may branch to step 622 and perform that step and the subsequent steps in process 600 as described above.

If process 600 determines at step 634 that neither trader is configured for manual acceptance of only part of the trade and that one trader is not configured for automatic execution of only part of the trade and/or the other trader is not configured for manual acceptance of the full trade, then process 600 may take the MF branch and proceed to step 640. Then each trader configured for manual acceptance of the full trade is asked whether that trader would like to execute the full trade.

Next, at step 644, process 600 may determine whether each trader prompted at step 640 elected to execute the full trade. If so, process may branch to step 630 and perform that step and the subsequent steps in process 600 as described above. Otherwise, process 644 may branch to step 622 and perform that step and the subsequent steps in process 600 as described above.

Although FIG. 6B illustrates a process 600 that tests for and processes automatic rejection (AR), automatic partial acceptance (AP), automatic full acceptance (AF), manual partial acceptance (MP), and manual full acceptance (MP), the present invention may be implemented without testing for these configuration selections and only perform tests, and subsequent processes, for configuration selections that are available.

Upon completing either step 622 or step 630, process 600 may proceed to step 648 (FIG. 6C) via links 624 and 646 (FIG. 6C) and then display a prompt asking the passive side trader if that trader would like to turn off the counterparty switch for the current counterparty (the aggressor).

After performing step 648 of FIG. 6C, process 600 then may determine at step 650 whether the passive side trader elected to turn "OFF" the counterparty switch at step 648. If so, then process 600 may turn "OFF" the corresponding counterparty switch at step 652. Once the switch has been turned "OFF" at step 652 or if the passive side trader did not elect to turn off the counterparty switch, process 600 may then display a prompt to the aggressive side trader asking whether the aggressive side trader would like to turn "OFF" the counterparty switch corresponding to the passive side trader. If the aggressive side trader elected to turn "OFF" the passive side trader at step 654, process 600, at step 656, may branch to step 658 whereupon the corresponding counterparty switch is set to "OFF." Otherwise, process 600 may return to step 604 (FIG. 6A) via links 660 and 602 (FIG. 6A).

Those skilled in the art will appreciate that the present invention can be practiced by other than the described embodiments, which are presented for purposes of illustration and not of limitation, and the present invention is limited only by the claims.

What is claimed is:

1. A method comprising the steps of:
receiving computer data signals conveying two passive trading orders for proposed transactions to be mediated with assistance of an electronic trading system, stored data for the orders indicating that a first of the two passive orders is entered with authority of a principal of the principal's real party in interest, and the stored data indicating that a second of the two passive orders is entered with authority of a broker acting on behalf of the broker's real party in interest from a broker workstation;
electronically determining presentation of the first and second passive orders to a prospective aggressor counterparty, a difference between the determined presentation of the two passive orders to the prospective aggressor counterparty being based at least in part on the stored indication of principal vs. broker authority, and preventing the prospective aggressor counterparty from acting on at least one of the passive trading orders based at least in part on a determination that the prospective aggressor is acting with the authority of a broker.

2. The method of claim 1, wherein:
the presenting includes displaying the first passive order in a different manner from the second passive order, the different presentations reflecting the respective principal and broker authorities of the passive orders' real parties in interest, wherein the different manner is using different colors, using different fonts, using flashing or hiding an unavailable passive order.

3. The method of claim 1, wherein:
the presentation to the prospective aggressor counterparty is by means of a display screen.

4. The method of claim 1, wherein:
preventing the prospective aggressor from acting on the passive trading order is executed by blocking the passive order from the prospective aggressor so that the aggressor's trading command does not form part of the trade.

5. The method of claim 4, further comprising the step of:
automatically executing a part of the value of a one of the passive orders based at least in part on a status as principal or broker of the party that entered the passive order to be automatically executed.

6. The method of claim 1, further comprising the step of:
automatically executing at least part of the value of a one of the passive orders based at least in part on a status as principal or broker of the prospective aggressor counterparty.

7. The method of claim 1, further comprising:
preventing the prospective aggressor counterparty from acting on the second passive order based at least in part on the broker authority of the second passive order.

8. The method of claim 1, further comprising the steps of:
in an electronic trading system for anonymous trading, setting in a non-transitory memory of an electronic trading system trading limitations to be applied to trading by a trader designated by the restrictions, the limitations indicating restrictions on tradability of orders by the designated trader, the trading restrictions based at least in part on a principal vs. broker role of the counterparties that entered the respective orders, the settings available to be set including a setting enabling the designated trader to trade orders entered by counterparty principals on a less-restricted basis and enabling trading of orders entered by counterparty brokers on a more-restricted basis; and imposing the trading limitations on the designated trader based at least in part on the stored trading limitation settings.

9. The method of claim 1, wherein:
the difference between the determined presentation includes presenting one of the two passive orders to the prospective aggressor counterparty, and blocking presentation of the other passive order.

10. The method of claim 1, wherein:
the difference between the determined presentation includes presenting the principal's passive order to the prospective aggressor counterparty, and blocking presentation of the broker's passive order.

11. The method of claim 1, wherein:
the determined presentation is further based at least in part on an comparison of the presented passive order to a warning limit between the prospective aggressor counterparty and the real party in interest associated with the passive order.

12. The method of claim 1, wherein:
the difference between the determined presentations of the two passive orders to the prospective aggressor counterparty includes indicating that one of the two passive orders is not available to be traded by the prospective aggressor counterparty.

13. The method of claim 12, wherein:
the principal's passive order is presented as tradeable to the prospective aggressor counterparty, and the broker's passive order is presented as non-tradeable to the prospective aggressor counterparty.

14. The method of claim 1, further comprising:
maintaining the identity of the real party in interest associated with a one of the passive orders and the identity of the prospective aggressor counterparty anonymous to each other.

15. The method of claim 14, further comprising:
revealing the identity of the real party in interest associated with a one of the passive orders and the identity of the prospective aggressor counterparty to each other before executing a trade between the one of the passive orders and the aggressive counterparty.

16. The method of claim 1, further comprising:
automatically executing the full value of a one of the passive orders based at least in part on a status as principal or broker of the party that entered the passive order to be automatically executed.

17. An apparatus comprising:
a processor;
a nonvolatile memory, having stored therein computer data signals representing two passive trading orders for proposed transactions to be mediated with assistance of an electronic trading system, the stored data for the orders indicating that a first of the two passive orders is entered with authority of a principal of the principal's real party in interest, and the stored data indicating that a second of the two passive orders is entered with authority of a broker acting on behalf of the broker's real party in interest from a broker workstation;

the memory further storing one or more computer programs designed to cause the processor to electronically determine presentation of the first and second passive orders to a prospective aggressor counterparty, a difference between the determined presentation of the two passive orders to the prospective aggressor counterparty to be based at least in part on the stored indication of principal vs. broker authority, and to prevent the prospective aggressor counterparty from acting on at least one of the passive trading orders based at least in part on a determination that the prospective aggressor is acting with the authority of a broker.

18. The apparatus of claim 17, wherein the programs are further designed to:
cause presentation to the prospective aggressor counterparty by means of a display screen.

19. The apparatus of claim 18, wherein the programs are further designed to:
cause display of the first passive order in a different manner from the second passive order, the different presentations reflecting the respective principal and broker authorities of the passive orders' real parties in interest, wherein the different manner is using different colors, using different fonts, using flashing or hiding an unavailable passive order.

20. The apparatus of claim 17, wherein the programs are further designed to:
prevent the prospective aggressor from acting on the passive trading order by blocking the passive order from the prospective aggressor so that the aggressor's trading command does not form part of the trade.

21. The apparatus of claim 20, wherein the programs are further designed to cause the processor to:
automatically execute a part of the value of a one of the passive orders based at least in part on a status as principal or broker of the party that entered the passive order to be automatically executed.

22. The apparatus of claim 17, wherein the programs are further designed to cause the processor to:
automatically execute at least part of the value of a one of the passive orders based at least in part on a status as principal or broker of the prospective aggressor counterparty.

23. The apparatus of claim 17, wherein the programs are further designed to cause the processor to:
prevent the prospective aggressor counterparty from acting on the second passive order based at least in part on the broker authority of the second passive order.

24. The apparatus of claim 17, wherein the programs are further designed to cause the processor to:
set in the memory trading limitations to be applied to trading by a trader designated by the restrictions, the limitations indicating restrictions on tradability of orders by the designated trader, the trading restrictions based at least in part on a principal vs. broker role of the counterparties that entered the respective orders, the settings available to be set including a setting enabling the designated trader to trade orders entered by counterparty principals on a less-restricted basis and enabling trading of orders entered by counterparty brokers on a more-restricted basis; and impose the trading limitations on the designated trader based at least in part on the stored trading limitation settings.

25. The apparatus of claim 17, wherein:
the difference between the determined presentation includes to present one of the two passive orders to the prospective aggressor counterparty, and to block presentation of the other passive order.

26. The apparatus of claim 17, wherein the programs are further designed to cause the processor to:
determine the difference between the presentation by presenting the principal's passive order to the prospective aggressor counterparty, and to block presentation of the broker's passive order.

27. The apparatus of claim 17, wherein the programs are further designed to cause the processor to:
determine presentation based at least in part on an comparison of the presented passive order to a warning limit between the prospective aggressor counterparty and the real party in interest associated with the passive order.

28. The apparatus of claim 17, wherein the programs are further designed to cause the processor to:
determine the difference between the presentations of the two passive orders to the prospective aggressor counterparty to indicate that one of the two passive orders is not available to be traded by the prospective aggressor counterparty.

29. The apparatus of claim 28, wherein the programs are further designed to cause the processor to:
present the principal's passive order as tradeable to the prospective aggressor counterparty, and the broker's passive order is presented as non-tradeable to the prospective aggressor counterparty.

30. The apparatus of claim 17, wherein the programs are further designed to cause the processor to:
maintain the identity of the real party in interest associated with a one of the passive orders and the identity of the prospective aggressor counterparty anonymous to each other.

31. The apparatus of claim 17, wherein the programs are further designed to cause the processor to:
reveal the identity of the real party in interest associated with a one of the passive orders and the identity of the prospective aggressor counterparty to each other before executing a trade between the one of the passive orders and the aggressive counterparty.

32. The apparatus of claim 17, wherein the programs are further designed to cause the processor to:
automatically execute the full value of a one of the passive orders based at least in part on a status as principal or broker of the party that entered the passive order to be automatically executed.

* * * * *